May 6, 1969  K. E. SUNDSTROM  3,443,090
RADIANT ENERGY ANALYZER FOR DIRECTLY MEASURING THE
POLARIZATION RATIO OF FLUORESCENT RADIATION
Filed June 20, 1966

INVENTOR.
KARL ERIK SUNDSTROM
BY
Paul R. Harder
ATTORNEY

United States Patent Office 3,443,090
Patented May 6, 1969

3,443,090
RADIANT ENERGY ANALYZER FOR DIRECTLY MEASURING THE POLARIZATION RATIO OF FLUORESCENT RADIATION
Karl Erik Sundstrom, Chene-Bougeries, Geneva, Switzerland, assignor to Beckman Instruments, Inc., a corporation of California
Filed June 20, 1966, Ser. No. 558,776
Int. Cl. H01j *39/00*
U.S. Cl. 250—43.5    6 Claims

ABSTRACT OF THE DISCLOSURE

A radiant energy analyzer capable of directly measuring the polarization ratio of fluorescent radiation is disclosed. A standard double beam ratio recording spectrophotometer may be readily modified to provide an analyzer capable of measuring directly the polarization ratio of fluorescent radiation by utilizing a single beam of the analyzer, providing polarized radiation at the sample cell, directing fluorescent radiation to the spectrophotometer detector and placing an analyzer therebetween, rotating the analyzer in synchronism but at half the frequency of the signal sorting demodulator of the spectrophotometer. In this way the signals in the reference and sample signal channels are respectively proportional to the fluorescent components parallel and perpendicular to the plane of polarization of the incident radiation. By interconnecting the signal channels to provide a sum of these signals, placing the sum across the slidewire of the position potentiometer of a recorder, feeding back to maintain the sum signal substantially constant while feeding one of the other signals to the differential amplifier of the recorder, the position of the recording servo is proportional to the ratio of the difference to the sum of the signal inputs.

---

This invention relates generally to radiant energy analyzers and more particularly to new and improved analyzers capable of recording directly the polarization ratio of fluorescent radiation.

Fluorescent radiation emitted by samples in many cases is polarized. A study of the polarization of this radiation provides information relating to the spatial properties of electronic transitions in molecules, the mobility of a molecule or a portion of the molecule and the lifetime of the excited state.

It is customary to express the polarization of a fluorescing sample in terms of the polarization ratio:

$$p = \frac{I_{11} - I_1}{I_{11} + I_1}$$

where $I_{11}$ is the intensity of fluorescent radiation parallel to the plane of plane-polarized exciting radiation and $I_1$ is the intensity of fluorescent radiation perpendicular to the plane of the plane-polarized exciting radiation. That is to say, $I_{11}$ and $I_1$ are the intensities of the radiation parallel and perpendicular to the electric vector E of the excitation radiation.

Conventional methods of obtaining polarized spectra have been slow and cumbersome. In the past it has been the practice to record $I_{11}$ as a function of wavelength and make a second recording of $I_1$ reducing this information to obtain the polarization ratio $p$ manually. More recently, automatic means have been developed for obtaining this ratio directly by providing an analyzer in the fluorescent beam and continuously rotating the analyzer at a rate that is relatively fast compared to the scanning rate. The output of the detector is an A.C. signal having a frequency twice the mechanical rotational frequency of the analyzer and the magnitude of A.C. signal is proportional to the numerator of $p$ or $I_{11}-I_1$. The average or D.C. value of the detector output is proportional to the denominator or the sum of the two components. By special filtering signals proportional to the difference and sum of the parallel and perpendicular intensity components may be derived which can be ratioed by conventional means. This method requires special circuitry not generally found in conventional spectrophotometers and is somewhat expensive compared to the present invention. Further, detector dark-current and D.C. drifts in the system will affect the sum-value but not the difference value and hence can cause inaccuracies in the indicated ratio.

Many double beam ratio recording spectrophotometers in use at the present time are provided with reference and sample beam paths and radiant energy passing these beam paths impinges alternately upon the detector. The output of the detector is sorted into reference and sample signal channels in which are produced electrical signals which are respectively proportional to the intensity of the radiation impinging upon the detector from the sample channel and from the reference channel. The reference signal is applied across the feedback slidewire of a recorder and the sample signal applied at its input. The shaft position and therefore the recorder, records the ratio of these signals or $I/I_o$ which is sample transmittance.

The present invention provides a convenient means with only minor modifications of the standard double beam ratio recording system for the direct recording of the polarization ratio and may be utilized with any ratio recording spectrophotometer which provides electrical signals proportional to reference and sample beam intensities. Thus, the present invention may be utilized with many conventional spectrophotometric ratio recording systems and all known methods of coding for information separation, that is by frequency, phase or time separation of the information signals, may be utilized.

Figure 1:
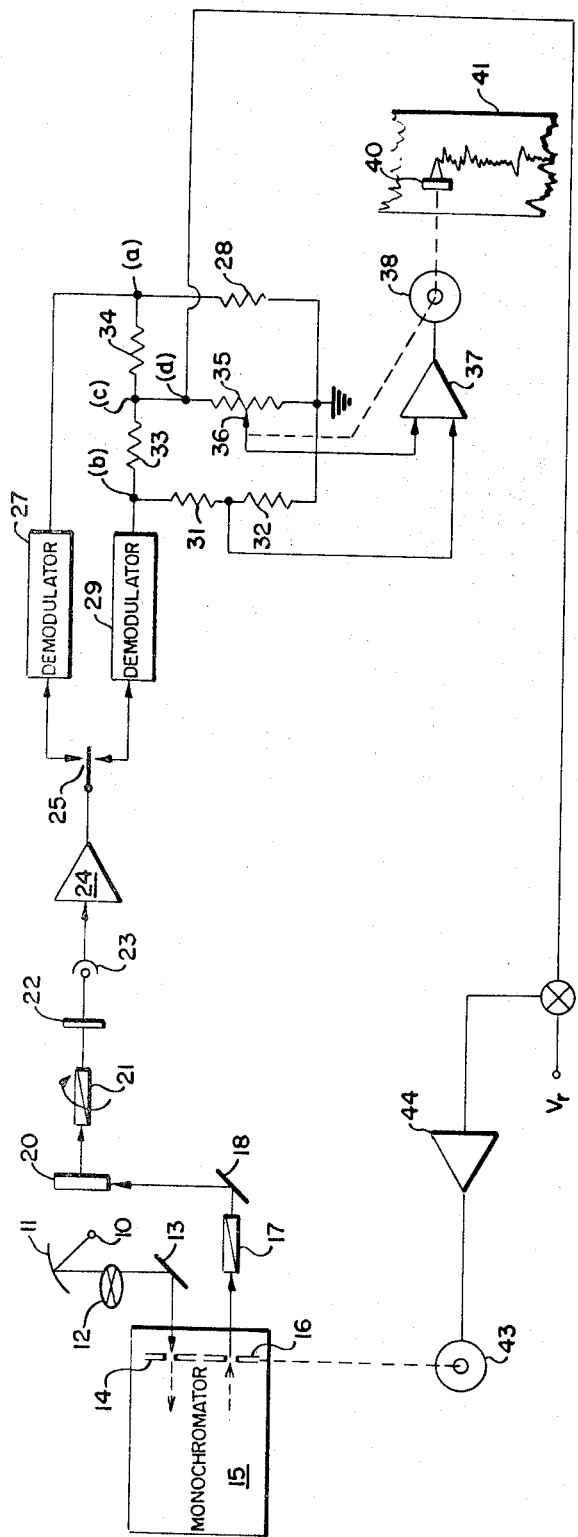
FIG. 1 is a schematic diagram of a ratio recording spectrophotometer incorporating the teachings of the present invention.

Referring now to FIG. 1, radiant energy from source 10 is directed by focusing mirror 11 through modulator 12 and by flat mirror 13 to the entrance slit 14 of monochromator 15 which disperses the radiant energy and scans a selected wavelength past the exit slit 16 in a conventional manner. Dispersed radiation from exit slit 16 is polarized in a suitable plane by polarizer 17 and directed by mirror 18 to sample cell 20. The beam path from source 10 through monochromator 15 to sample cell 20 may be considered the excitation beam path and radiant energy therein excitation radiation. Polarizer 17 is not essential to a practice of the invention since fluorescent radiation will be polarized in some plane. The presence of polarizer 17 does, however, aid in reducing some ambiguities which might otherwise arise.

Fluorescent radiation leaving the sample cell at right angles to the excitation beam path is passed by an analyzer 21 and filter 22 to detector 23. Analyzer 21 may be continuously rotated in synchronism with, but at half the frequency of, the signal sorting demodulator 25 by any suitable means, not shown. In many instances the signal sorting demodulator comprises mechanical switches driven from the beam switching drive motor which may be utilized to also drive the analyzer. Filter 22 is selected to have a band pass which will pass only the fluorescent radiation from the sample thereby eliminating excitation radiation in the beam path due to scattering of the sample and other stray radiation. It is not essential to select the fluorescent beam path at right angles to the excitation beam path although this is the general practice since scattered excitation radiation is generally a minimum at right angles to the excitation beam path. In some instances it may be desirable to place a monochromator in the fluorescent beam path to provide a selected wavelength at detector 23. With such an arrangement the fluorescent radiation may be scanned while the exciting radiation is held at fixed wavelength.

Figure 2:
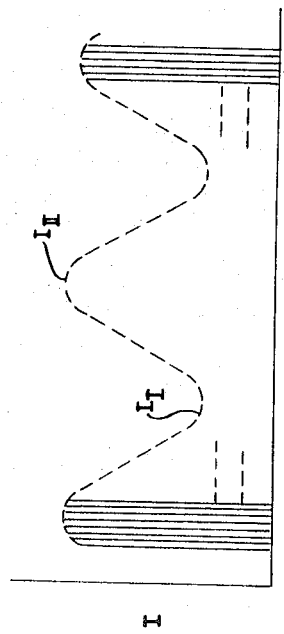
FIG. 2 illustrates the optical signal at the detector as a function of time.

With modulator 12 and a continuously rotating analyzer the radiant energy signal at detector 23 is illustrated in FIG. 2 in idealized form. The optical signal at the detector consists of a series of high frequency pulses due to the modulation of modulator 12 which may operate to modulate the optical signal at a frequency of, for example, 400 c.p.s. The amplitude of the signal will vary between a maxima and minimum at twice the frequency of rotation of analyzer 21. The maximum amplitude of the A.C. signal represents the intensity of one of the components, for example, the intensity of the fluorescent component parallel to the plane of polarization of the incident radiation or $I_{11}$ and the minimum point is proportional to the perpendicular component or $I_1$. It should be understood that $I_1$ may be larger than $I_{11}$. Thus, the optical signal at the detector contains components which are proportional to the intensity of the fluorescent radiation parallel and perpendicular to the plane of the polarized exciting radiation. Detector 23 converts the radiant energy signal into a corresponding electrical signal which is passed by amplifier 24 to signal sorter or demodulator 25. The signal sorter 25 may have an armature which is driven at twice the frequency of analyzer 21 and operates to sort the electrical signal proportional to the intensity of the fluorescent radiation parallel to the polarized excitation energy into one channel of the instrument and the electrical signal proportional to the intensity of the fluorescent radiation perpendicular to the polarized excitation energy into the other channel. These distinct electrical channels within the system may comprise in a standard double beam ratio recording spectrophotometer the reference and sample channels and it is generally desirable, alththough not entirely necessary, that the parallel component be fed to the reference channel and the perpendicular component to the sample channel. The dwell time of signal sorter 25 may be arranged such that only the peaks are provided to the respective demodulators. Any number of schemes may be utilized to provide signals proportional to the maxima and minimum amplitude of the optical signal. Therefore, demodulators 27 and 29 provide at their outputs D.C. signals respectively proportional to $I_{11}$ and $I_1$.

Consider now the ratioing circuitry connected to the outputs of demodulators 27 and 29. Junctions ($a$) and ($b$) are connected respectively through resistor 28 and resistors 31 and 32 to circuit ground. Resistors 33 and 34 interconnect junctions ($a$) and ($b$) and form junction ($c$) connected through resistor 35 to circuit ground. If $R_{33}=R_{34}$ and if $R_{35}$ is large compared to $R_{33}$ and $R_{34}$ so that no loading occurs at the junction ($c$), then the signals at junctions ($a$) and ($b$), $I_a$ and $I_b$, are summed across resistors 33 and 34 and the signal at ($c$) is represented by $$I_c = \frac{I_a + I_b}{2} \quad (1)$$

If resistor 35 is the slidewire of a follow-up potentiometer and $R_{31}=0$, the signal $I_b$ is recorded against the sum signal across slidewire 35. That is, if differential amplifier 37 has as its inputs the signal $I_b$ (when $R_{31}=0$) and the signal $I_d$ at slider 36 and its output connected to a servo motor 38 mechanically coupled to slider 36, servo motor 38 will drive slider 36 in a direction such as to reduce the input to differential amplifier 37 to zero.

If $\theta$ is the position of slider 36 from junction ($c$), then $$I_d = I_c - \theta I_c \quad (2)$$

Since the servo will drive the slider to equalize the signals at the input of amplifier 37 then at null $$I_d = I_b \quad (3)$$

Therefore, $$I_c(1-\theta) = I_b \quad (4)$$

Substituting Equation 1 in Equation 4, we have $$\frac{I_b + I_a}{2}(1-\theta) = I_b \quad (5)$$

Simplifying and solving for $\theta$ we find:

$$\theta = \frac{I_a - I_b}{I_a + I_b} \quad (6)$$

It is obvious that $I_a$ and $I_b$ are the outputs of demodulators 27 and 29 respectively and therefore $$I_a = I_{11}, \quad (7)$$
$$I_b = I_1 \quad (8)$$

and $$\theta = \frac{I_{11} - I_1}{I_{11} + I_1} \quad (9)$$

Thus the shaft position of servo 38 is proportional to the polarization ratio of the fluorescent radiation and the servo 38 may be utilized to drive a pen 40 on a recording chart 41 to provide a record of the polarization ratio directly.

In the preceding it has been assumed that $R_{31}$ was zero. Therefore, if $I_1$ is greater than $I_2$, $\theta$ is negative and we find it is not possible to record spectra where $I_1$ is greater than the sum of $$\frac{I_1 + I_{11}}{2}$$

which is, of course, the case when $I_1$ is greater than $I_{11}$.

For this reason $R_{31}$ is utilized in the circuit and made equal to $R_{32}$ such that the signal at the input of amplifier 37 is now $I_1/2$. In this case the recorder will be at midscale when $I_1 = I_{11}$ and when $I_1$ is zero, the recorder will be at zero and when $I_{11}$ is zero the recorder will be at 100%. The output of servo 38 remains, however, proportional to $$\frac{I_{11} - I_1}{I_{11} + I_1}$$

This may be shown by the following:

If we assume that at the mid-point on slidewire 35 that the $\theta$ is 0 and at the upper end $\theta = -1$ and the lower end $\theta = +1$, then $$I_d = \frac{1}{2}I_c - \theta(\frac{1}{2}I_c) \quad (10)$$

when $$-1 < \theta < +1$$

Again we know that the servo will drive the slider such that $$I_d = \frac{1}{2}I_b \quad (11)$$

since $R_{31}$ and $R_{32}$ are equal.
Therefore, $$\frac{1}{2}I_c(1-\theta) = \frac{1}{2}I_b \quad (12)$$

Since $$I_c = \frac{I_{11} + I_1}{2} \quad (13)$$

substituting and solving for $\theta$ we again find that $$\theta = \frac{I_{11} - I_1}{I_1 + I_{11}} \quad (14)$$

We now have a system which will record the polarization ratio of fluorescent radiation from an exicted sample directly as a function of time, wavelength of exciting radiation and in which, by the utilization of a second monochromator in the fluorescent path, as a function of the fluorescent radiation wavelength.

From Equation 1 it is obvious that the signal at junction (c) may be used to control the slits of the monochromator to provide constant energy in the excitation beam path in conventional fashion. To accomplish this, the signal $I_c$ is compared with a fixed reference $V_r$ to develop a difference signal utilized to control the slit servo 43 via amplifier 44.

It will be obvious to those skilled in the art that most of the components present in the embodiment of FIG. 1 are those normally found in a standard double beam ratio recording system. It is only necessary to block one of the beams and provide an analyzer rotating at half the frequency of the signal sorter. Only a minor modification of the ratio recording circuitry need be made to provide an instrument which will record the polarization ratio directly. It should also be obvious that many standard means of coding the signal information, whether by frequency, phase or time separation, may be utilized.

Obviously many modifications and variations will be apparent to those skilled in the art of which the invention pertains and it is to be understand that, within the spirit and scope of the appended claims, the invention may be practiced otherwise than as specifically described.

What is claimed is:

1. A ratioing device for providing the ratio of the difference between first and second electrical signals to the sum thereof comprising:
    a slidewire having a slider movable therealong;
    servo means having first and second inputs and an output;
    means connecting said output to said slider;
    means connecting said slider to one of said inputs whereby said servo drives said slider in a direction to equalize the signals at said inputs;
    circuit means connecting one of said electrical signals to said second input of said servo means; and
    means providing a signal proportional to the sum of said first and second electrical signals and connecting said signal across said slidewire.

2. The ratioing device as claimed in claim 1 wherein said signal proportional to the sum of said first and second electrical signals is proportional to the average thereof and said circuit means connecting said one electrical signal to said second input of said servo means includes signal dividing means for providing at said second input a signal approximately equal to one-half of said one electrical signal.

3. The ratioing device according to claim 1 in combination with spectrophotometric means including:
    means producing excitation radiation for exciting a sample;
    analyzer means positioned to receive fluorescent radiation from an excited sample;
    means for continuously rotating said analyzer to provide parallel and perpendicular polarized components;
    detector means positioned to receive radiation from said analyzer and producing an electrical signal having first and second components respectively proportional to said parallel and perpendicular polarized components; and
    signal sorting means for separating said first and second components to provide respectively said first and second electrical signals.

4. A spectrophotometer for directly recording the polarization of fluorescence comprising:
    means for producing excitation radiation at the surface of a sample cell for exciting a sample;
    analyzer means positioned to receive fluorescent radiation from said sample;
    means continuously rotating said analyzer to provide parallel and perpendicular polarized components;
    detector means positioned to receive radiation from said analyzer and producing an electrical signal having first and second components respectively proportional to said parallel and perpendicular components;
    first and second electrical channels;
    sorting means separating said first and second components and supplying said components respectively to said first and second electrical channels whereby first and second electrical signals are provided in said channels respectively proportional to the parallel and perpendicular polarized components;
    a slidewire having a slider movable therealong;
    servo means having first and second inputs and an output;
    means connecting said output to said slider;
    means connecting said slider to one of said inputs whereby said servo drives said slider in a direction to equalize the signals at said inputs;
    means interconnecting said first and second electrical channels to provide an electrical signal proportional to the sum of said parallel and perpendicular polarized components;
    means connecting said sum signal across said slidewire; and
    means connecting said electrical signal proportional to said perpendicular component to the second of said inputs of said servo means whereby the output of said servo is proportional to the ratio of the difference between said parallel and perpendicular components to the sum thereof.

5. The analyzer according to claim 4 wherein said sum signal is proportional to the average of said first and second components and the signal to said second input of said servo means is proportional to half of said perpendicular component.

6. The spectrophotometer according to claim 5 further including means for ploarizing in a plane said excitation radiation.

References Cited

UNITED STATES PATENTS

| | | |
|---|---|---|
| 2,540,780 | 2/1951 | Gabel et al. |
| 2,896,165 | 7/1959 | Hornig et al. |
| 3,071,037 | 1/1963 | Brumley. |

ARCHIE R. BORCHELT, *Primary Examiner.*

U.S. Cl. X.R.

250—71; 88—14